(12) United States Patent
Shin et al.

(10) Patent No.: US 9,186,800 B2
(45) Date of Patent: Nov. 17, 2015

(54) BUMPER ASSEMBLY OF MOBILE ROBOT

(75) Inventors: Kyung Chul Shin, Seoul (KR); Seong Ju Park, Incheon (KR); No Soo Lee, Incheon (KR)

(73) Assignee: YUJIN ROBOT CO., LTD., Seoul (KR)

( * ) Notice: Subject to any disclaimer, the term of this patent is extended or adjusted under 35 U.S.C. 154(b) by 17 days.

(21) Appl. No.: 14/130,891

(22) PCT Filed: Jul. 6, 2012

(86) PCT No.: PCT/KR2012/005357
§ 371 (c)(1),
(2), (4) Date: Jan. 3, 2014

(87) PCT Pub. No.: WO2013/006005
PCT Pub. Date: Jan. 10, 2013

(65) Prior Publication Data
US 2014/0138964 A1    May 22, 2014

(30) Foreign Application Priority Data

Jul. 6, 2011    (KR) .......................... 10-2011-0066957

(51) Int. Cl.
| | |
|---|---|
| *B25J 19/02* | (2006.01) |
| *B25J 19/00* | (2006.01) |
| *B25J 19/06* | (2006.01) |
| *G01L 1/00* | (2006.01) |
| *B60L 3/00* | (2006.01) |

(52) U.S. Cl.
CPC .............. *B25J 19/02* (2013.01); *B25J 19/0091* (2013.01); *B25J 19/063* (2013.01); *B60L 3/0069* (2013.01); *G01L 1/00* (2013.01); *A47L 2201/04* (2013.01)

(58) Field of Classification Search
CPC .. B25J 19/0091; B25J 19/063; A47L 2201/04
USPC .................................................. 293/102, 117
See application file for complete search history.

(56) References Cited

U.S. PATENT DOCUMENTS

| | | | | |
|---|---|---|---|---|
| 4,951,985 A | * | 8/1990 | Pong et al. ..................... | 293/102 |
| 2010/0133022 A1 | * | 6/2010 | Chung et al. .................... | 180/21 |

FOREIGN PATENT DOCUMENTS

| | | |
|---|---|---|
| DE | 102004035762 A1 | 2/2005 |
| JP | 2006-072502 A | 3/2006 |
| JP | 2006-217949 A | 8/2006 |
| KR | 10-0765848 B1 | 10/2007 |
| KR | 10-2008-0051942 A | 6/2008 |

OTHER PUBLICATIONS

International Search Report for PCT/KR2012/005357 filed on Jul. 6, 2012.

* cited by examiner

*Primary Examiner* — Joseph D Pape

(57) ABSTRACT

A bumper assembly of a mobile robot includes a sliding member which is installed to be movable in front and rear directions with respect to a robot body, a first elastic member which is coupled to the sliding member and presses the sliding member in the front direction, a first sensor which senses a movement of the sliding member when the sliding member moves in the rear direction, a front plate which is disposed at a front side of the sliding member, rotatably coupled to the sliding member, and moves integrally with the sliding member when the sliding member moves in the front and rear directions, and a second sensor which senses a rotation of the front plate when the front plate rotates.

15 Claims, 10 Drawing Sheets

BUMPER ASSEMBLY OF MOBILE ROBOT

CROSS-REFERENCE TO RELATED APPLICATION

The present application claims priority of Korean Patent Application No. 10-2011-0066957, filed on Jul. 6, 2011, which is incorporated herein by reference in its entirety.

BACKGROUND

1. Field of the Invention

The present invention relates to a bumper assembly of a mobile robot, and more particularly, to a bumper assembly of a mobile robot capable of accurately sensing a broadside collision as well as a head-on collision when the mobile robot collides with an obstacle.

2. Description of Related Art

A mobile robot refers to a robot that may run autonomously and perform specific tasks, and there are a cleaning robot, a monitoring robot, and the like in accordance with tasks to be performed. The mobile robot generally has a function capable of autonomously performing assigned tasks, for example, cleaning work or monitoring work.

When describing a cleaning mobile robot as an example, the cleaning mobile robot autonomously moves in a predetermined cleaning zone such as a house or an office, and sucks dust or foreign substances. To this end, in addition to a configuration of a general vacuum cleaner that sucks dust or foreign substances, the mobile robot includes a moving device which allows a robot to move, a plurality of sensing sensors that senses obstacles so that the robot may run without colliding with various obstacles in the cleaning zone, a battery which supplies electric power, a microprocessor which controls the entire apparatus, and the like.

Particularly, the mobile robot uses a plurality of sensing sensors to identify a distance to various types of obstacles, for example, obstacles such as furniture, and walls, which are installed in the cleaning zone, and cleans the cleaning zone while running without colliding with the obstacles using identified information. Therefore, a capability of sensing obstacles is very important in order for the mobile robot to perform given tasks while autonomously running. That is, it is essential that the mobile robot has a function of recognizing positions of obstacles at the periphery of the mobile robot so as to allow the mobile robot to move without colliding with the obstacles, and immediately sensing a collision when the mobile robot collides with the obstacle so as to change a moving route.

As a method of sensing whether a mobile robot collides with an obstacle, there is a method of providing sensors on an inner circumferential surface of a bumper of the mobile robot and allowing the sensors to sense a collision with the obstacle. However, the sensors are disposed at a predetermined interval along the inner circumferential surface of the bumper, and thus, there is a problem in that the collision may not be sensed when a portion where the sensor is not attached collides with the obstacle. As another method of sensing a collision with the obstacle, there is a method of configuring a bumper of a mobile robot to be movable in front and rear directions with respect to a robot body, and allowing a sensor to sense a movement of the bumper when the mobile robot collides with the obstacle and then the bumper is pushed in the rear direction. However, this method may sense a head-on collision well, but there is a problem in that this method may not sense a broadside collision.

SUMMARY

The present invention has been made in an effort to resolve the aforementioned problems in the related art, and an object of the present invention is to provide a bumper assembly of a mobile robot capable of sensing whether a collision with an obstacle occurs when the mobile robot collides with the obstacle, over the entire region that may collide with the obstacle.

In addition, an object of the present invention is to provide a bumper assembly of a mobile robot capable of accurately sensing a broadside collision as well as a head-on collision.

In order to resolve the aforementioned problems, the present invention provides a bumper assembly of a mobile robot, including: a sliding member which is installed to be movable in front and rear directions with respect to a robot body; a first elastic member which presses the sliding member in the front direction; a first sensor which senses a movement of the sliding member when the sliding member moves in the rear direction at a predetermined distance or more; a front plate which is provided at a front side of the sliding member, rotatably coupled to the sliding member, and moves integrally with the sliding member when the sliding member moves in the front and rear directions; and a second sensor which senses a rotation of the front plate when the front plate rotates at a predetermined angle or more.

Here, it is preferable that a plane of the front plate has an arc shape.

Further, it is preferable that the bumper assembly of the mobile robot further includes a guide member a position of which is fixed with respect to the robot body, and which guides a movement of the sliding member in the front and rear directions. Here, a guide projection may be formed on any one surface of surfaces of the sliding member and the guide member, which face each other, and a guide groove may be formed in the other surface.

Furthermore, the bumper assembly of the mobile robot may further include a base member to which the first sensor, the first elastic member, and the guide member are fixed, in which the sliding member is movably accommodated, and which is fixed to the robot body.

The first sensor and the second sensor may be contact sensors.

It is preferable that the front plate includes a coupling portion which is extended in the rear direction from an inner circumferential surface of the front plate, and rotatably coupled to the sliding member. In addition, it is preferable that a rotation shaft is formed at any one of the sliding member and the coupling portion, and a coupling hole into which the rotation shaft is inserted is formed in the other. Here, it is preferable that the bumper assembly of the mobile robot further includes a cover which is coupled to the sliding member with the coupling portion interposed therebetween so as to prevent the coupling portion from being separated from the sliding member.

The bumper assembly of the mobile robot may further include a second elastic member which provides pressing force that rotates the front plate in a direction opposite to one direction when the front plate rotates in the one direction.

In addition, the bumper assembly of the mobile robot may further include a balancing member which is coupled to the sliding member so as to move integrally with the sliding member, and has both ends that come into contact with the front plate symmetrically on the basis of a centerline of the front plate so as to press the front plate in the front direction. Here, it is preferable that the front plate includes pin seating grooves which are formed on an inner circumferential surface of the front plate so that both the ends of the balancing member are seated in the pin seating grooves, and it is preferable that the bumper assembly of the mobile robot further includes a cover which couples the balancing member to the sliding member.

The front plate may include a rotation restriction projection which protrudes in a radial direction from an inner circumferential surface of the front plate, and comes into contact with one side of the robot body when the front plate rotates at a predetermined angle so as to prevent the front plate from rotating while exceeding the predetermined angle.

In addition, the first sensor is a contact sensor and disposed at a rear side of the sliding member, the sliding member includes an accommodating groove which is depressed in the front direction from a rear surface of the sliding member and opened in the rear direction, a pressing member which is inserted into the accommodating groove so as to be movable in the front and rear directions, and a third elastic member which is interposed between the accommodating groove and the pressing member so as to press the pressing member toward the first sensor side, and the pressing member may come into contact with the first sensor when the sliding member moves in the rear direction at the predetermined distance or more. According to the exemplary embodiment of the present invention, a collision may be sensed even though an obstacle collides with any portion of the circumference of the front plate, and therefore, there are effects in that a shadow zone, which may not sense a collision, is eliminated, and a range, which may sense a collision with an obstacle, is enlarged to the entire region that may collide with an obstacle.

In addition, according to the exemplary embodiment of the present invention, there is an effect in that a broadside collision as well as a head-on collision may be accurately sensed.

DETAILED DESCRIPTION

Figure 1:
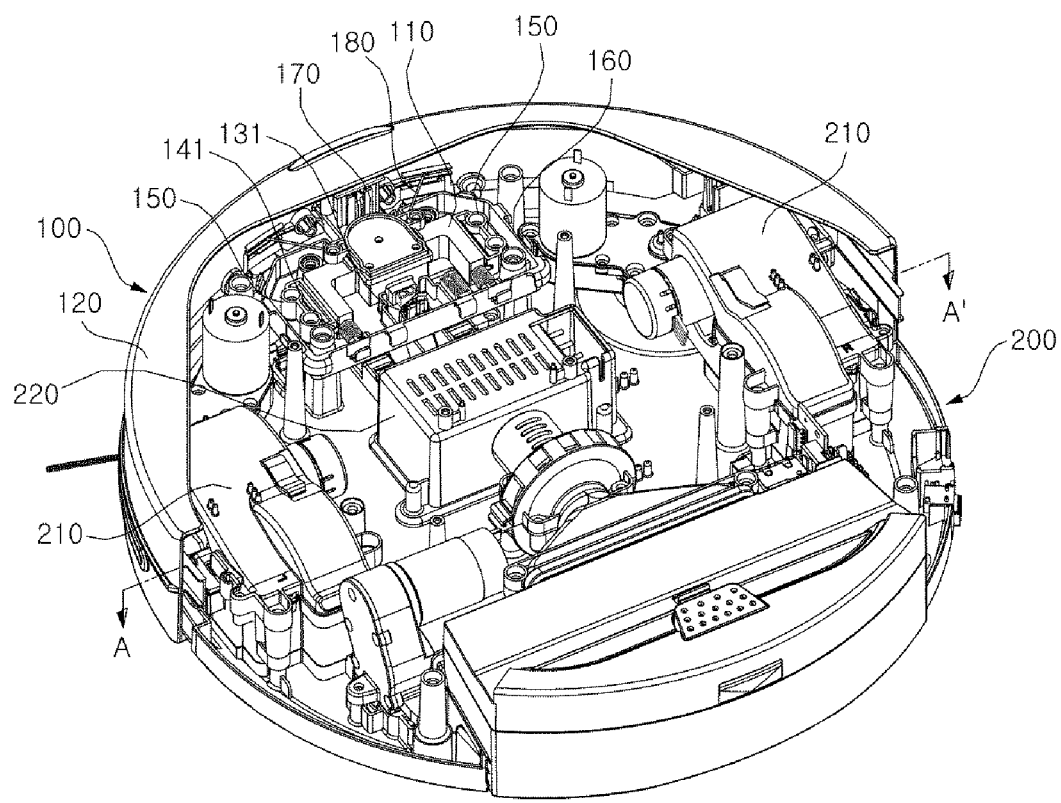
FIG. 1 is a perspective view of a mobile robot in which a bumper assembly of a mobile robot according to an exemplary embodiment of the present invention is installed.

Hereinafter, an exemplary embodiment of the present invention will be described in detail with reference to the accompanying drawings. First, when reference numerals refer to components of each drawing, it is noted that although the same components are illustrated in different drawings, the same components are referred to by the same reference numerals as possible. In addition, in the description of the present invention, the detailed descriptions of known related constitutions or functions thereof may be omitted if they make the gist of the present invention unclear.

Figure 2:
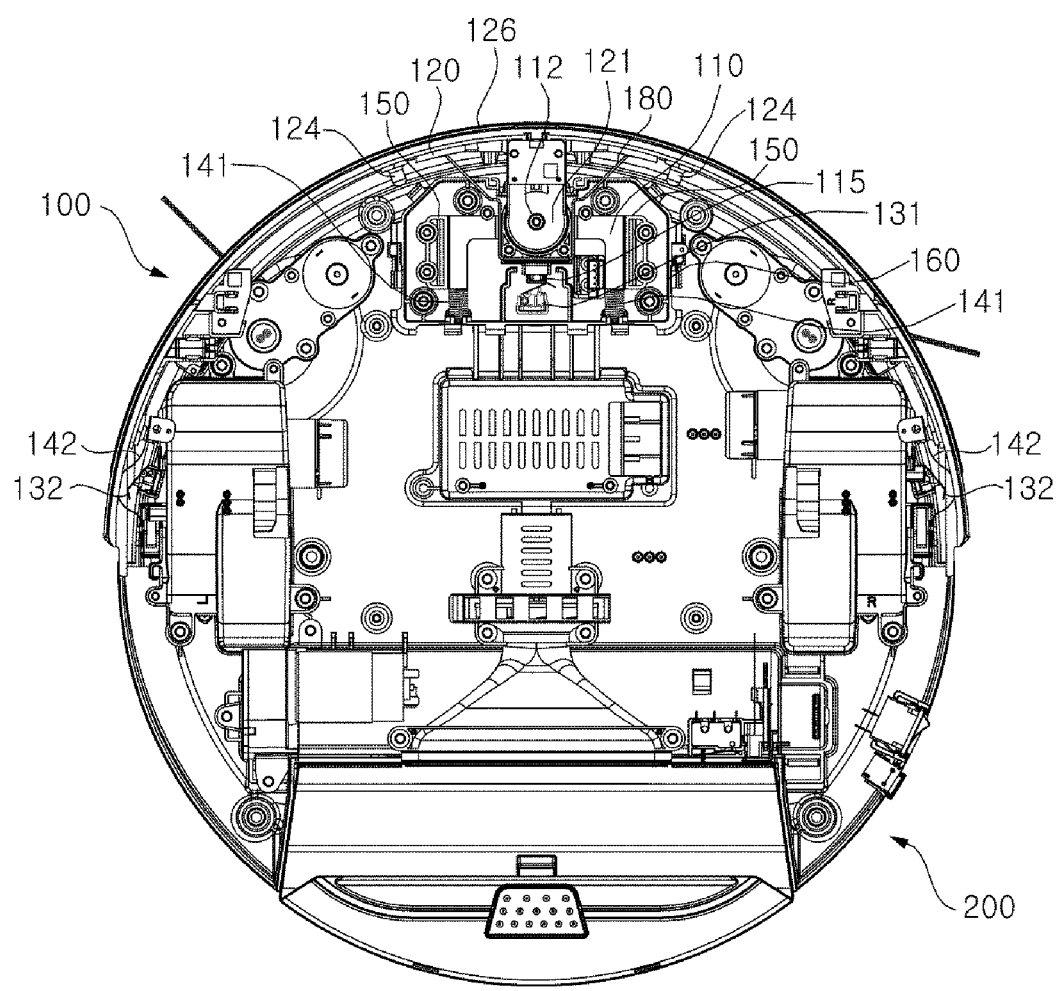
FIG. 2 is a top plan view when viewed from line A-A' of FIG. 1.
Figure 3:
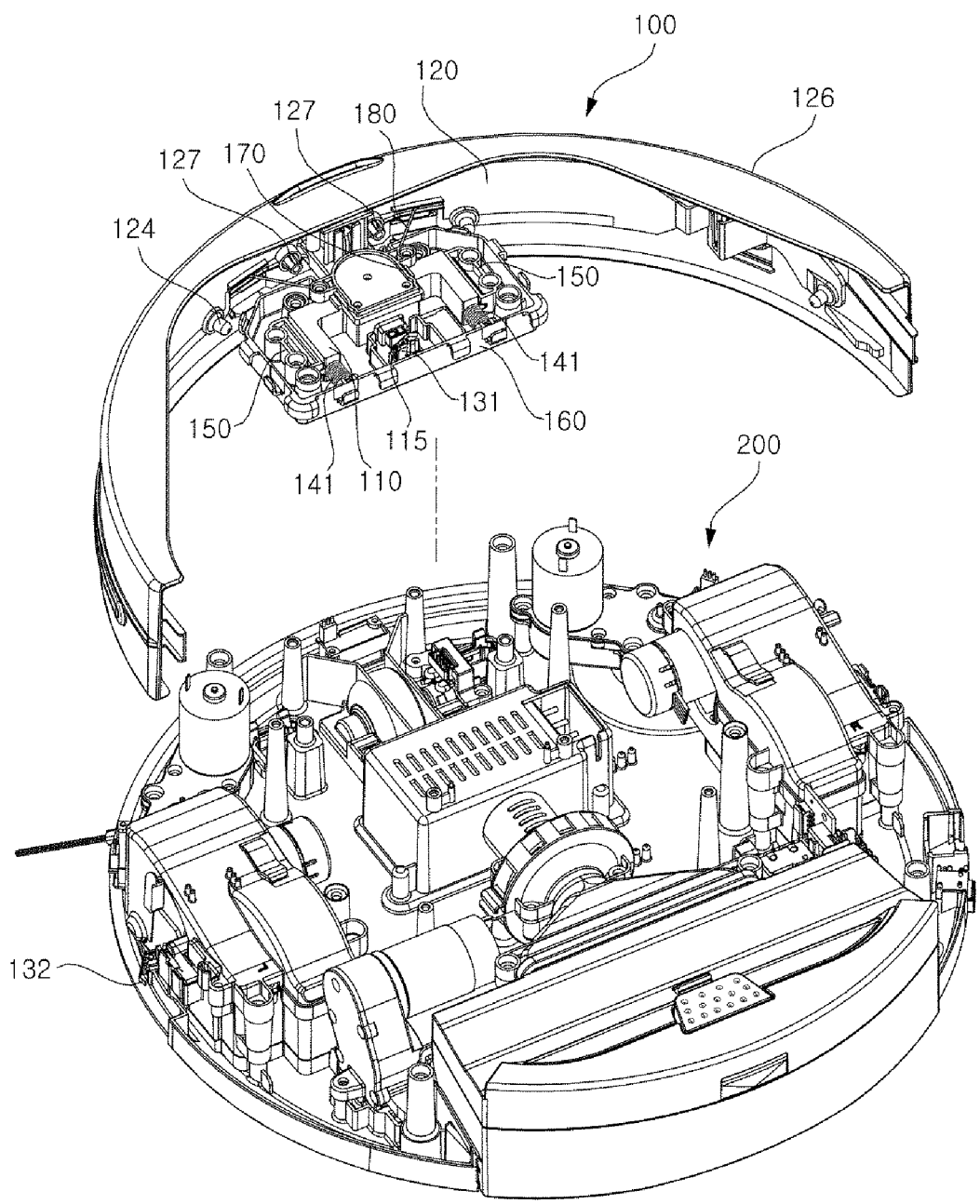
FIG. 3 is a perspective view illustrating an exploded coupling relationship between the bumper assembly of the mobile robot according to the exemplary embodiment of the present invention and a robot body.
Figure 4:
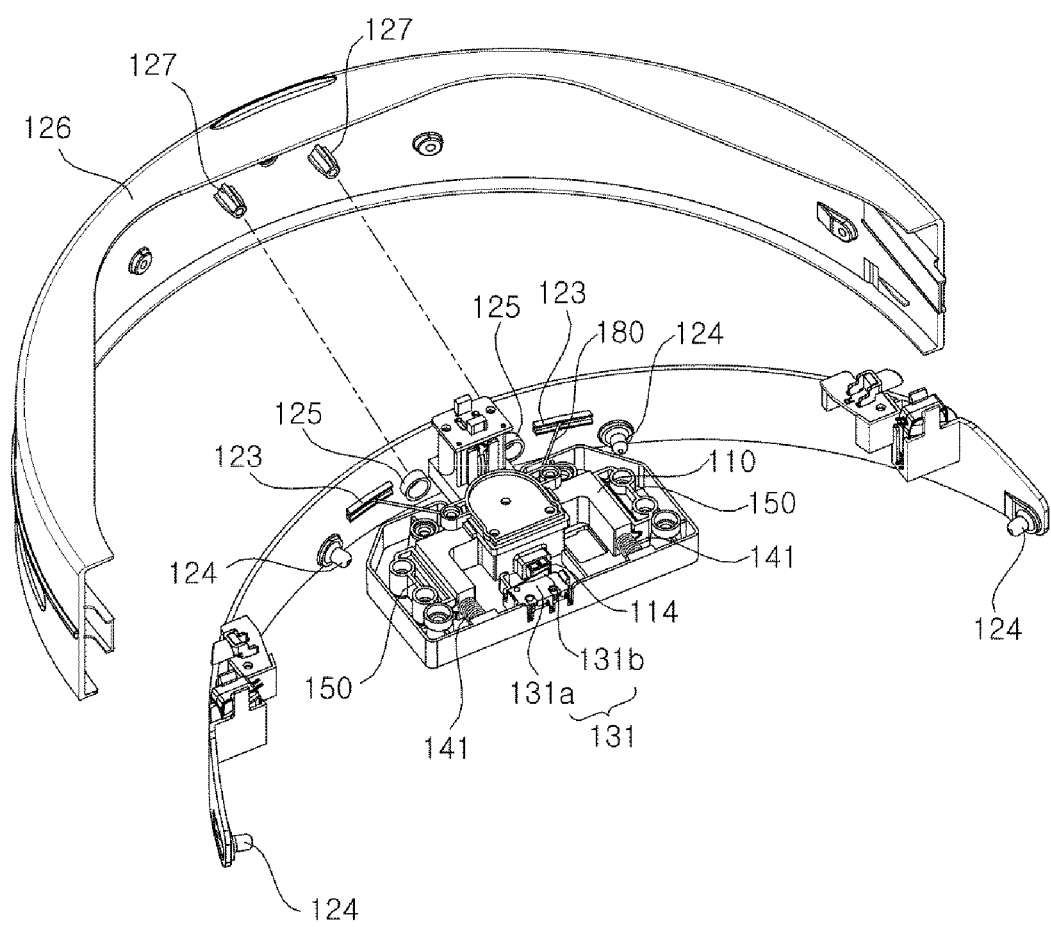
FIG. 4 is a perspective view illustrating an exploded coupling relationship between the bumper assembly of the mobile robot according to the exemplary embodiment of the present invention and a cover plate.
Figure 5:
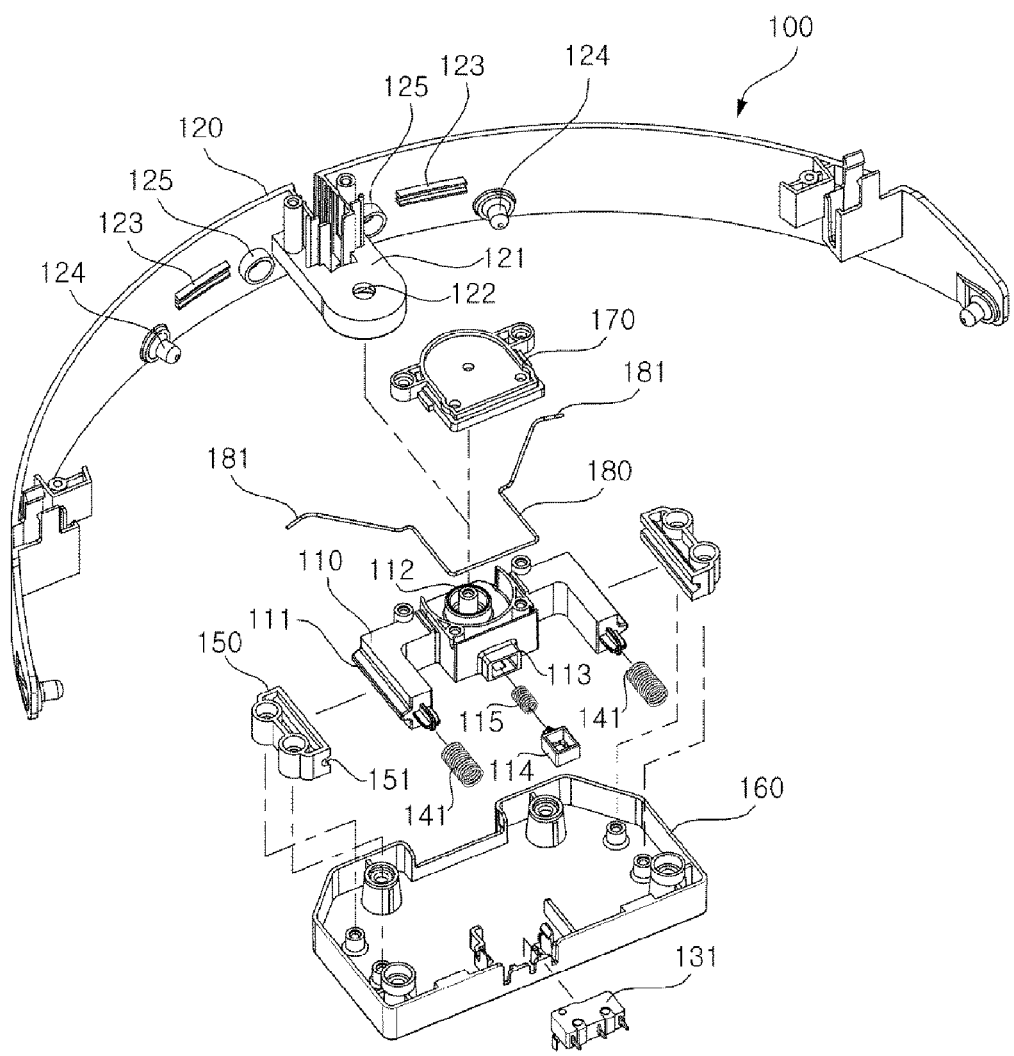
FIG. 5 is a perspective view illustrating an exploded state of the bumper assembly of the mobile robot according to the exemplary embodiment of the present invention.
Figure 6:
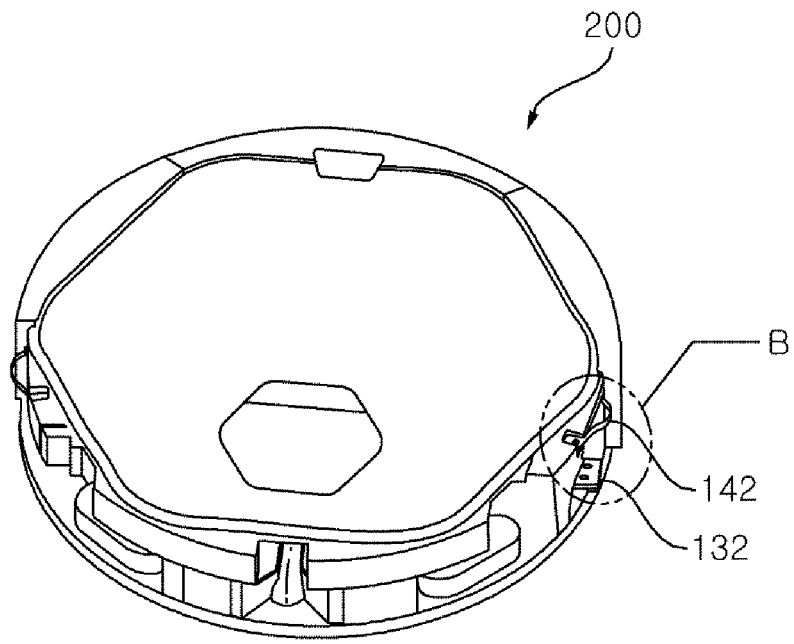
FIG. 6 is a perspective view of a robot body to which the bumper assembly of the mobile robot according to the exemplary embodiment of the present invention is installed.
Figure 7:
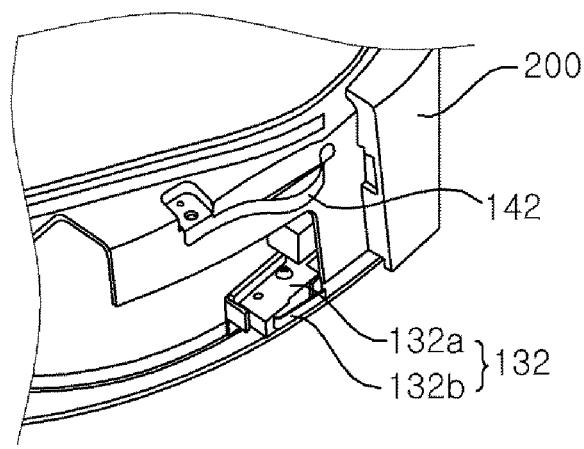
FIG. 7 is an enlarged view of part B of FIG. 6.
Figure 8:
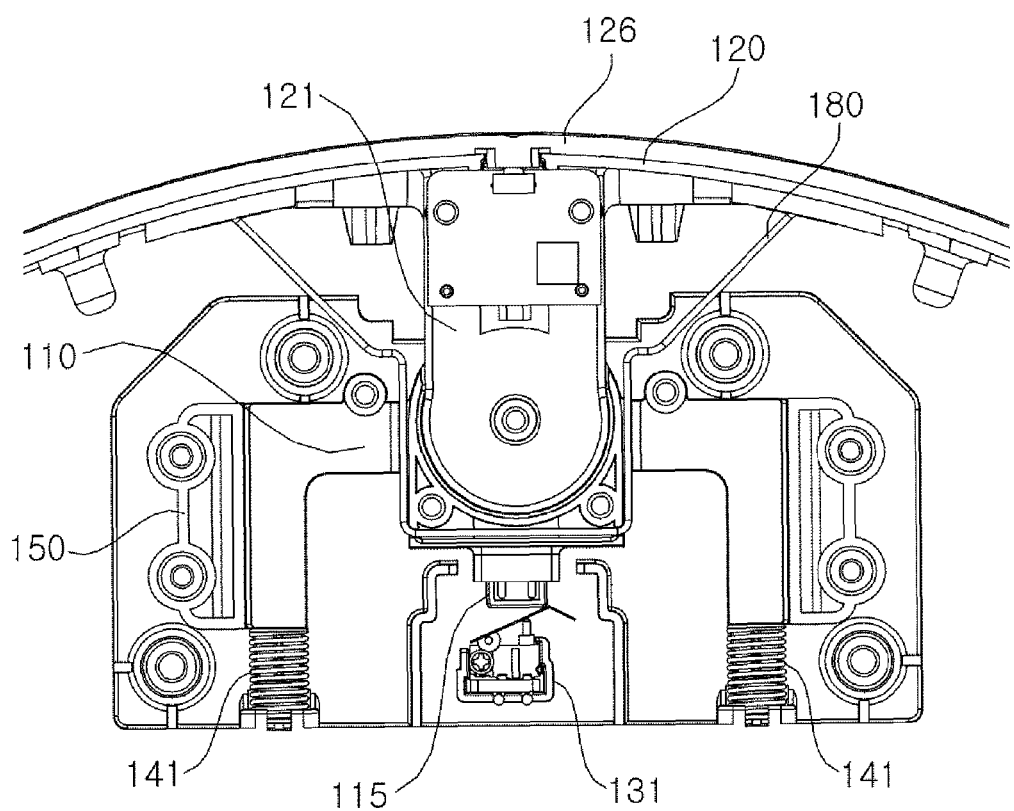
FIGS. 8 and 9 are views sequentially illustrating processes in which the bumper assembly of the mobile robot according to the exemplary embodiment of the present invention senses a head-on collision.
Figure 9:
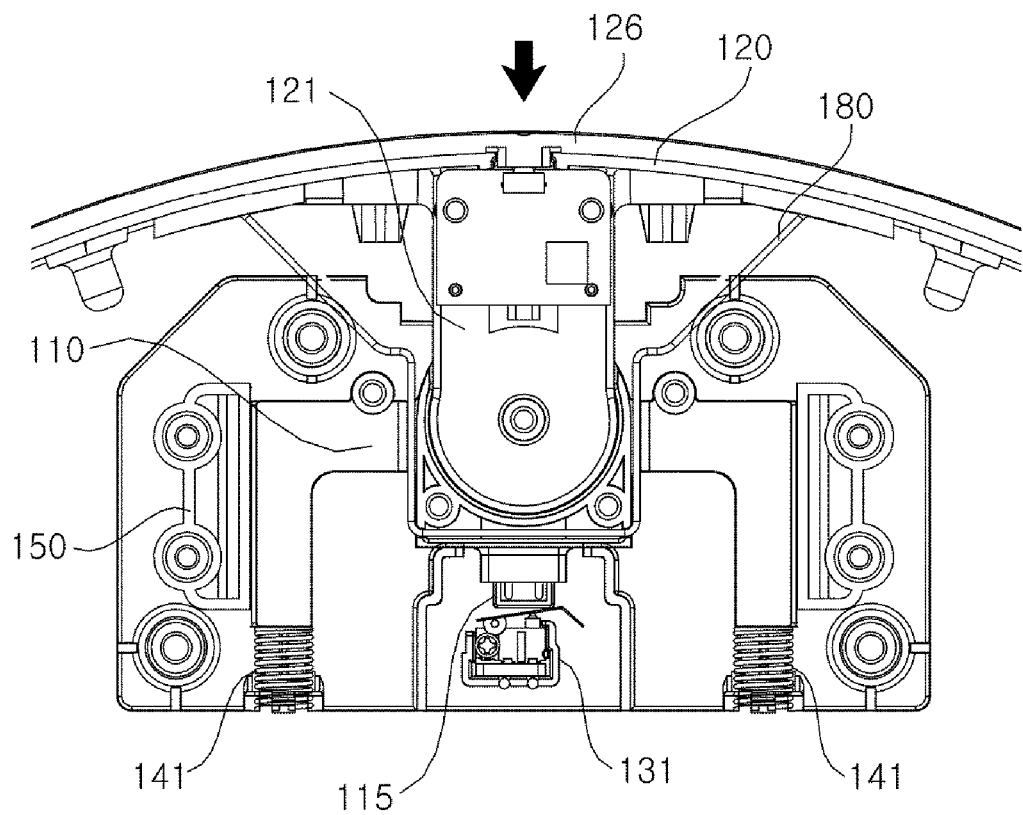
Figure 10:
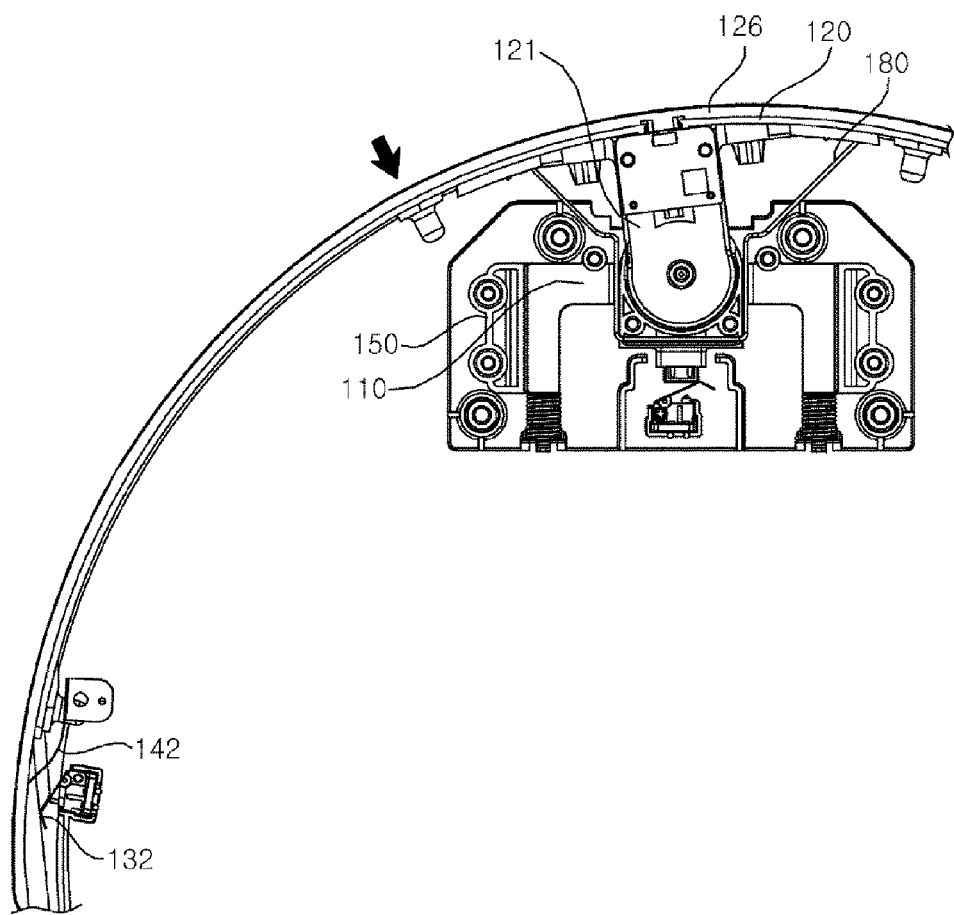
FIGS. 10 and 11 are views illustrating examples in which the bumper assembly of the mobile robot according to the exemplary embodiment of the present invention senses a left side collision and a right side collision.
Figure 11:
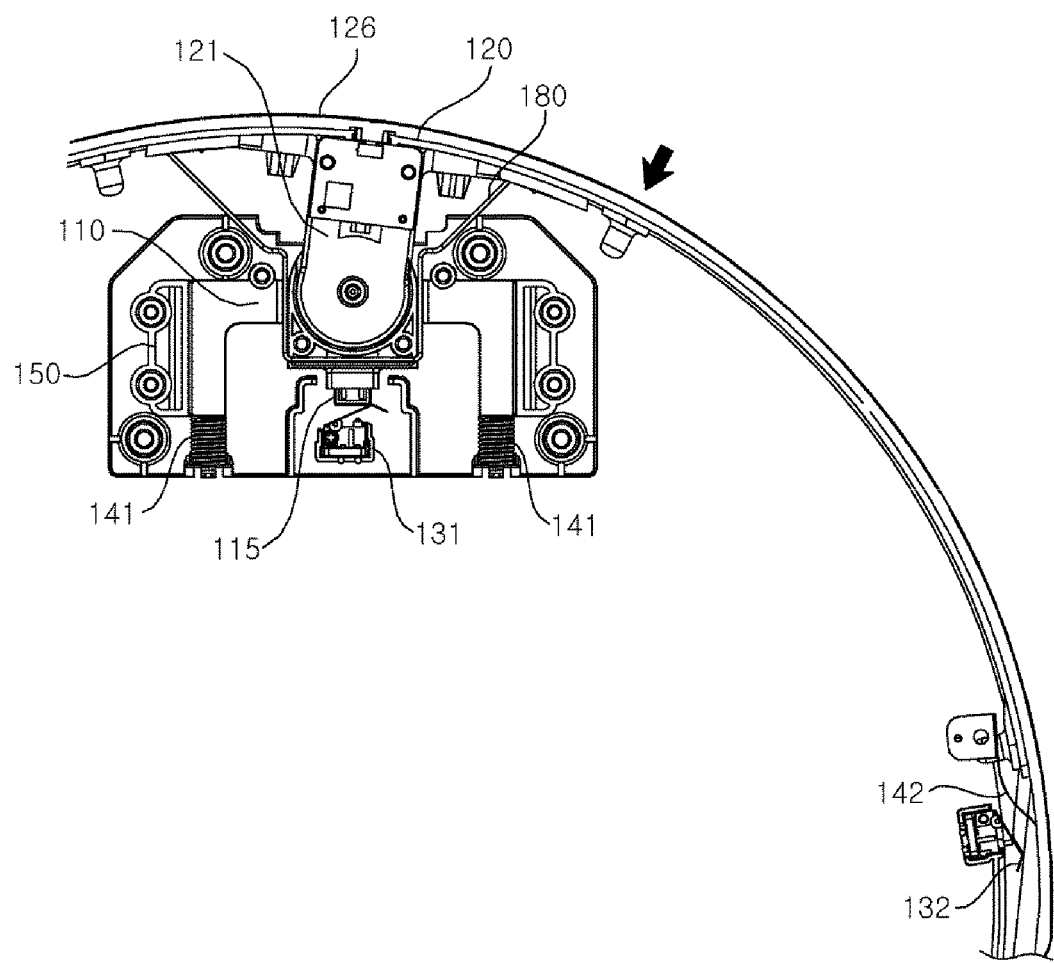

FIG. 1 is a perspective view of a mobile robot in which a bumper assembly of a mobile robot according to an exemplary embodiment of the present invention is installed, FIG. 2 is a top plan view when viewed from line A-A' of FIG. 1, and FIG. 3 is a perspective view illustrating an exploded coupling relationship between the bumper assembly of the mobile robot according to the exemplary embodiment of the present invention and a robot body. Further, FIG. 4 is a perspective view illustrating an exploded coupling relationship between the bumper assembly of the mobile robot according to the exemplary embodiment of the present invention and a cover plate, FIG. 5 is a perspective view illustrating an exploded state of the bumper assembly of the mobile robot according to the exemplary embodiment of the present invention, FIG. 6 is a perspective view of a robot body to which the bumper assembly of the mobile robot according to the exemplary embodiment of the present invention is installed, and FIG. 7 is an enlarged view of part B of FIG. 6. FIGS. 8 and 9 are views sequentially illustrating processes in which the bumper assembly of the mobile robot according to the exemplary embodiment of the present invention senses a head-on collision, and FIGS. 10 and 11 are views illustrating examples in which the bumper assembly of the mobile robot according to the exemplary embodiment of the present invention senses a left side collision and a right side collision.

The bumper assembly of the mobile robot according to the present invention may be operated after being installed in various mobile robots that run autonomously and perform specific tasks. Hereinafter, a configuration in which the bumper assembly of the mobile robot according to the present invention is installed in a cleaning mobile robot will be described as an example.

A robot body 200 forms an external appearance of the mobile robot, and has a plane shape that is approximately circular. A running device 210 which allows the mobile robot to move, a battery 220 which supplies electric power, a microprocessor (not illustrated) which controls the entire apparatus, and the like are installed in the robot body 200.

The bumper assembly of the mobile robot according to the exemplary embodiment of the present invention is installed in the robot body 200, particularly, on a front surface of the robot body 200 so as to sense a collision when the mobile robot collides with an obstacle.

The bumper assembly of the mobile robot according to the exemplary embodiment of the present invention includes a sliding member 110, a front plate 120, a first sensor 131, first elastic members 141, second sensors 132, guide members 150, a base member 160, a cover 170, second elastic members 142, and a balancing member 180.

The sliding member 110 is installed to be movable in front and rear directions with respect to the robot body 200, and pressed in the front direction by the first elastic member 141. The sliding member 110 includes a rotation shaft 112, an accommodating groove 113, a pressing member 114, and a third elastic member 115. When the sliding member moves in the rear direction at a predetermined distance or more, the first sensor 131 senses the movement of the sliding member. The front plate 120 is provided at a front side of the sliding member 110, and moves integrally with the sliding member 110 when the sliding member 110 moves in the front and rear directions. The front plate 120 is rotatably coupled to the sliding member 110, and when the front plate 120 rotates at a predetermined angle or more, the second sensor 132 senses the rotation of the front plate 120. A coupling portion 121, pin seating grooves 123, and rotation restriction projections 124 are formed at the front plate 120. A position of the guide member 150 is fixed with respect to the robot body 200, and the guide member 150 guides a movement of the sliding member 110 in the front and rear directions. The base member 160 is fixed to the robot body 200, the first sensor 131, the first elastic member 141, and the guide member 150 are fixed to the base member 160, and the sliding member 110 is movably accommodated in the base member 160. The cover 170 is coupled to the sliding member 110 with the coupling portion 121 of the front plate 120 interposed therebetween, prevents the coupling portion 121 from being separated from the sliding member 110, and couples the balancing member 180 to the sliding member 110. The balancing member 180 is coupled to the sliding member 110 so as to move integrally with the sliding member 110, and both ends 181 of the balancing member 180 come into contact with the front plate 120 symmetrically on the basis of a centerline of the front plate 120. The pressing member 114 is inserted into the accommodating groove 113 of the sliding member 110 so as to be movable in the front and rear directions, and pressed toward the first sensor 131 side by the third elastic member 115.

Hereinafter, constituent elements of the bumper assembly 100 of the mobile robot according to the exemplary embodiment of the present invention will be described in detail.

The sliding member 110 is installed to be movable in the front and rear directions with respect to the robot body 200, and the front plate 120 is rotatably coupled to the sliding member 110. In order to allow the front plate 120 to be rotatably coupled to the sliding member 110, the rotation shaft 112 is provided in the sliding member 110. The sliding member 110 is pressed in the front direction by the first elastic member 141. The first elastic member 141 may be a coil spring.

The first sensor 131 is installed to be spaced apart from a rear side of the sliding member 110 at a predetermined distance, and senses the movement of the sliding member 110 when the sliding member 110 moves in the rear direction at a predetermined distance or more. The first sensor 131 may be a contact sensor or a non-contact sensor, and in the case of the present exemplary embodiment, the first sensor 131 is implemented as a contact sensor such as a micro switch that senses an object when the object comes into contact with a contact portion. The first sensor 131 may include a sensor body 131a, and a contact portion 131b which may come into contact with the sensor body 131a when an object comes into contact with the contact portion 131b, and may move away from the sensor body 131a while being elastically deformed when the contact portion 131b is released from the contact with the object. In the present exemplary embodiment, when the sliding member 110 moves in the rear direction at a predetermined distance and then comes into contact with the first sensor 131, the first sensor 131 senses the sliding member 110.

In this case, when the sliding member 110 excessively moves in the rear direction, there is a risk that the first sensor 131 is damaged. Therefore, in order to prevent the first sensor 131 from being damaged, the sliding member 110 may include the accommodating groove 113, the pressing member 114, and the third elastic member 115. The accommodating groove 113 is depressed in the front direction from a rear surface of the sliding member 110, and opened in the rear direction. The pressing member 114 is inserted into the accommodating groove 113 so as to be movable in the front and rear directions. The third elastic member 115 is interposed between the accommodating groove 113 and the pressing member 114, and presses the pressing member 114 toward the first sensor 131 side. The pressing member 114 is pressed toward the first sensor 131 side by the third elastic member 115 such that a part of the pressing member 114 in a longitudinal direction is usually exposed to the outside of the accommodating groove 113. The pressing member 114 moves together with the sliding member 110 when the sliding member 110 moves in the rear direction, and comes into contact with the first sensor 131 when the sliding member 110 moves at a predetermined distance or more. When the pressing member 114 presses the first sensor 131, the first sensor 131 senses the pressing member 114. In this state, when the sliding member 110 further moves in the rear direction, the pressing member 114 is inserted into the accommodating groove 113 by reaction force of the first sensor 131. Therefore, even though the sliding member 110 further moves in the rear direction, a predetermined amount or more of force is not applied to the first sensor 131, thereby preventing the first sensor 131 from being damaged. Therefore, the third elastic member 115 preferably has a certain amount of elastic force which allows the pressing member 114 to move together with the sliding member 110 when the sliding member 110 moves in the rear direction so that the first sensor 131 may sense the contact with the sliding member 110, and allows the pressing member 114 to be inserted into the accommodating groove 113 by reaction force of the first sensor 131 after the first sensor 131 senses the sliding member 110.

The guide members 150 are provided on both side surfaces of the sliding member 110, and positions of the guide members 150 are fixed with respect to the robot body 200. The guide member 150 guides the movement of the sliding member 110 in the front and rear directions. In the present exemplary embodiment, in order to fix the position of the guide member 150 with respect to the robot body 200, the guide member 150 is fixed to the base member 160 that is fixed to the robot body 200. The base member 160 will be described below in detail. However, it is not necessary to fix the guide member 150 to the base member 160, and the guide member 150 may be fixed directly to the robot body 200. A guide groove 151, which is extended in the front and rear directions, is provided in a surface of the guide member 150 which faces the sliding member 110, and a guide projection 111, which has a shape that matches a shape of the guide groove 151, is formed on a surface of the sliding member 110 which faces the guide member 150. The guide projection 111 slides along the guide groove 151 such that a movement route of the sliding member 110 is guided by the guide member 150.

The front plate 120 is provided at a front side of the sliding member 110, and an outer circumferential surface of the front plate 120 forms a front surface and lateral surfaces of the mobile robot. Therefore, a plane shape of the front plate 120 is formed to approximately match a plane shape of the mobile robot. In the present exemplary embodiment, the plane shape of the mobile robot is formed to be circular, and thus, the plane of the front plate 120 has an arc shape. A length of the perimeter of the front plate 120 is approximately half a length of the perimeter of the mobile robot, but these lengths may be adjusted by a user as necessary. When the mobile robot collides with an obstacle, the obstacle collides with a part of the outer circumferential surface of the front plate 120. The obstacle may collide with any portion among a front surface, a left surface, or a right surface of the front plate 120.

The coupling portion 121, which is extended in the rear direction from an inner circumferential surface of the front plate 120, and has a coupling hole 122 into which the rotation shaft 112 of the sliding member 110 is inserted, is provided on the front plate 120 so as to be coupled to the sliding member 110. The rotation shaft 112 is inserted into the coupling hole 122 of the coupling portion 121 such that the front plate 120 may be coupled to the sliding member 110, and may rotate about the rotation shaft 112. The front plate 120 rotates about the rotation shaft 112 clockwise or counterclockwise. When viewed from an upper side of the front plate 120, in a case in which force is applied to a left portion of the front plate 120, the front plate 120 rotates about the rotation shaft 112 counterclockwise. In contrast, in a case in which force is applied to a right portion of the front plate 120, the front plate 120 rotates clockwise. In addition, the front plate 120 and the sliding member 110 integrally move in the front and rear directions with being coupled to each other by the coupling portion 121.

A cover plate 126 may be coupled to the front surface of the front plate 120. Coupling projections 127, which protrude from an inner circumferential surface of the cover plate 126, are inserted into and fixed to front holes 125 formed in the front plate 120 such that the cover plate 126 may be coupled to the front plate 120. In a case in which the cover plate 126 is provided on the front surface of the front plate 120, an obstacle collides with the cover plate 126 when the mobile robot collides with the obstacle, and thus, only the cover plate 126 may be replaced when the cover plate 126 is damaged by the collision.

Meanwhile, in the exemplary embodiment, the rotation shaft 112 is provided in the sliding member 110, and the coupling hole 122 is formed in the front plate 120, but on the contrary, a rotation shaft may be formed at the front plate 120, and a coupling hole may be formed in the sliding member 110. In addition, in the present exemplary embodiment, the guide projection 111 is formed on the sliding member 110, and the guide groove 151 is formed in the guide member 150, but on the contrary, a guide projection may be formed on the guide member 150, and a guide groove may be formed in the sliding member 110.

The second sensor 132 is installed at one side of the robot body 200, and senses a rotation of the front plate 120 when the front plate 120 rotates clockwise or counterclockwise at a predetermined angle or more. The second sensor 132 may be a contact sensor or a non-contact sensor, and in the case of the present exemplary embodiment, the second sensor 132 is a contact sensor that is operated in the same manner as the first sensor 131. The second sensor 132 includes a sensor body 132a, and a contact portion 132b which may come into contact with the sensor body 132a when an object comes into contact with the contact portion 132b, and may move away from the sensor body 132a while being elastically deformed when the contact portion 132b is released from the contact with the object. It is preferable that at least one second sensor 132 is provided at both sides each on the basis of the centerline in the front and rear directions of the robot body 200, and two or more second sensors 132 may be provided at both sides each as necessary. When the contact portion 132b of the second sensor 132 is installed to face the inner circumferential surface of the front plate 120 and to be spaced apart from the inner circumferential surface of the front plate 120 by a predetermined distance, the inner circumferential surface of the front plate 120 comes into contact with the contact portion 132b of the second sensor 132 when the front plate 120 rotates at a predetermined angle, and the second sensor 132 senses the front plate 120. Therefore, when the front plate 120 rotates at a predetermined angle or more, the rotation of the front plate 120 is sensed by the second sensor 132.

The second elastic member 142 is provided at one side of the robot body 200 so as to provide pressing force that rotates the front plate 120 in a direction opposite to a direction in which the front plate 120 has rotated when the front plate 120 rotates clockwise or counterclockwise. When force is applied to a left side or a right side of the front plate 120 such that the front plate 120 rotates in one direction so as to come into contact with the second sensor 132, and thereafter, the force being applied to the front plate 120 is removed, the front plate 120 returns to a neutral position by the second elastic member 142. Like the second sensor 132, at least one second elastic member 142 is also provided at both sides each on the basis of the centerline in the front and rear directions of the robot body 200. The second elastic member 142 may be a flat spring.

The rotation restriction projection 124 protrudes in a radial direction from the inner circumferential surface of the front plate 120. The rotation restriction projection 124 comes into contact with one side of the robot body 200 when the front plate 120 rotates at a predetermined angle so as to prevent the front plate 120 from rotating while exceeding the predetermined angle. It is preferable that at least one rotation restriction projection 124 is provided at both sides each on the basis of the centerline of the front plate 120.

The balancing member 180 is coupled to the sliding member 110 so as to move integrally with the sliding member 110, and both ends 181 of the balancing member 180 come into contact with the inner circumferential surface of the front plate 120 symmetrically on the basis of the centerline of the front plate 120 so as to press the front plate 120 in the front direction. The front plate 120 is coupled to the sliding member 110 by the rotation shaft 112, and thus, even though no force is applied to the front plate 120, the front plate 120 may rotate about the rotation shaft 112 when the mobile robot moves. However, the front plate 120 is pressed in the front direction by both the ends 181 of the balancing member 180 such that the front plate 120 may maintain the neutral position when no force is applied to the front plate 120. In order to stably maintain the state in which both the ends of the balancing member 180 are in contact with the front plate 120, the pin seating grooves 123 in which both the ends 181 of the balancing member 180 are seated may be formed on the inner circumferential surface of the front plate 120.

The cover 170 is coupled to the sliding member 110 with the coupling portion 121 and the balancing member 180 interposed therebetween so as to couple the balancing member 180 to the sliding member 110, and prevents the coupling portion 121 from being separated from the sliding member 110. In the present exemplary embodiment, the balancing member 180 and the coupling portion 121 are provided on an upper surface of the sliding member 110, and the cover 170 covers the upper surface of the sliding member 110 such that a coupling relationship of the balancing member 180 and the coupling portion 121 with respect to the sliding member 110 is maintained.

The base member 160 includes a predetermined accommodating space, and is fixed to the robot body 200. The first sensor 131, the first elastic members 141, and the guide members 150 are fixed in the accommodating space of the base member 160, and the sliding member 110 is accommodated in the accommodating space of the base member 160 so as to be movable in the front and rear directions. The first sensor 131, the first elastic members 141, and the guide members 150 may be fixed to one side of the robot body 200, and the sliding member 110 may be installed movably at one side of the robot body 200. However, in the case in which the first sensor 131, the first elastic members 141, and the guide members 150 are fixed to the base member 160, and the sliding member 110 is accommodated in the base member 160, the bumper assembly 100 of the mobile robot according to the present invention may be modularized, and as a result, there is an effect in that assembly and maintenance are convenient.

As illustrated in FIG. 8, when the mobile robot is stopped or normally runs, the bumper assembly 100 of the mobile robot according to the exemplary embodiment of the present invention maintains a state in which the front plate 120 is in the neutral position, that is to say, the front plate 120 does not rotate in any direction. When the mobile robot collides with an obstacle, force is applied to the front plate 120 in a radial direction of the robot body 200. In a case in which an obstacle undergoes a head-on collision with the mobile robot, that is, in a case in which the obstacle collides with a center portion of the front plate 120, force, which passes through the rotation shaft 112 and is directed toward a center of the robot body 200, is applied to the front plate 120. Therefore, as illustrated in FIG. 9, by the head-on collision, the front plate 120 moves in the rear direction, and the sliding member 110 coupled to the front plate 120 moves in the rear direction integrally with the front plate 120. The sliding member 110 moves in the rear direction by a predetermined distance such that the pressing member 114 comes into contact with the first sensor 131, and the first sensor 131 senses the contact with the pressing member 114 and transmits the sensed contact to a control unit (not illustrated) such that the collision with the obstacle is sensed. Thereafter, when the mobile robot moves away from the obstacle, force being applied to the front plate 120 is removed such that the front plate 120 and the sliding member 110 return in the front direction by the first elastic members 141.

In a case in which the obstacle collides with the left side or the right side that is spaced apart from the front side of the mobile robot, force is applied to the front plate 120 in a direction toward the center of the robot body 200. This force does not pass through the rotation shaft 112 such that moment occurs at the front plate 120, and by this moment, the front plate 120 rotates about the rotation shaft 112 counterclockwise or clockwise as illustrated in FIGS. 10 and 11. When the front plate 120 rotates in one direction by a predetermined angle, the inner circumferential surface of the front plate 120 or the cover plate 126 comes into contact with the second sensor 132, and the second sensor 132 senses the contact with the second sensor 132 and transmits the sensed contact to the control unit, and as a result, the collision with the obstacle is sensed. Thereafter, when the mobile robot moves away from the obstacle, force being applied to the front plate 120 is removed such that the front plate 120 and the cover plate 126 return to the neutral position by the second elastic member 142.

As described above, a region, which is likely to collide with an obstacle when the circular mobile robot moves, is a semicircular region positioned at the front side of the mobile robot. The bumper assembly 100 of the mobile robot according to the exemplary embodiment of the present invention is configured so that the front plate 120 is rotatably coupled to the sliding member 110, and the front plate 120 moves integrally with the sliding member 110 in the front and rear directions, and thereby, there is an advantage in that even though an obstacle collides with any portion of the circumference of the front plate 120, the collision may be sensed. Therefore, there are effects in that a shadow zone, which may not sense a collision, is eliminated, and a range, which may sense a collision with an obstacle, is enlarged to the entire region that may collide with an obstacle.

Although an exemplary embodiment of the present invention has been described for illustrative purposes, those skilled in the art will appreciate that various modifications, changes and substitutions are possible, without departing from the scope and spirit of the invention. Accordingly, the exemplary embodiment disclosed in the present invention is not intended to limit but illustrate the technical spirit of the present invention, and the scope of the technical spirit of the present invention is not limited by the exemplary embodiment. The protection scope of the present invention should be construed based on the following appended claims and it should be appreciated that all technical spirits included within the scope equivalent to the claims belong to the present invention.

The invention claimed is:

1. A bumper assembly of a mobile robot, comprising:
   a sliding member which is installed to be movable in front and rear directions with respect to a robot body;
   a first elastic member which is coupled to the sliding member and presses the sliding member in the front direction;
   a first sensor which senses a movement of the sliding member when the sliding member moves in the rear direction;
   a front plate which is disposed at a front side of the sliding member, rotatably coupled to the sliding member, and moves integrally with the sliding member when the sliding member moves in the front and rear directions; and
   a second sensor which senses a rotation of the front plate when the front plate rotates.

2. The bumper assembly of claim 1, wherein a top surface of the front plate has an arc shape.

3. The bumper assembly of claim 1, further comprising:
   a guide member which is coupled and fixed to the robot body, and which guides a movement of the sliding member in the front and rear directions.

4. The bumper assembly of claim 3, wherein the sliding member has a first surface and the guide member has a second surface opposite to the first surface, and wherein a guide projection is formed on one of the first and second surfaces, and a guide groove is formed in the other of the first and second surfaces.

5. The bumper assembly of claim 3, further comprising:
   a base member fixed to the robot body,
   wherein the first sensor, the first elastic member, and the guide member are fixed to the base member, and the sliding member is movably accommodated in the base member.

6. The bumper assembly of claim 1, wherein the first sensor and the second sensor are contact sensors.

7. The bumper assembly of claim 1, wherein the front plate includes a coupling portion extending in the rear direction from an inner circumferential surface of the front plate, the coupling portion being rotatably coupled to the sliding member.

8. The bumper assembly of claim 7, wherein one of the sliding member and the coupling portion includes a rotation shaft, and the other of the sliding member and the coupling portion includes a coupling hole into which the rotation shaft is inserted.

9. The bumper assembly of claim 8, further comprising:
   a cover which is coupled to the sliding member and the coupling portion such that the coupling portion is interposed between the cover and the sliding member so as to prevent the coupling portion from being separated from the sliding member.

10. The bumper assembly of claim 8, wherein the front plate rotates about the rotation shaft in a first direction by external force, the bumper assembly further comprising:
    a second elastic member which provides pressing force to rotate the front plate about the rotation shaft in a second direction opposite to the first direction.

11. The bumper assembly of claim 1, further comprising:
a balancing member which is coupled to the sliding member so as to move integrally with the sliding member, the balancing member having two end portions that each contact a corresponding portion of an inner circumferential surface of the front plate symmetrically with respect to an axis of symmetry of a top surface of the front plate so as to press the front plate in the front direction.

12. The bumper assembly of claim 11, wherein the front plate includes pin seating grooves which are formed on the inner circumferential surface of the front plate so that the end portions of the balancing member are seated in the pin seating grooves.

13. The bumper assembly of claim 11, further comprising:
a cover which couples the balancing member to the sliding member.

14. The bumper assembly of claim 1, wherein the front plate includes a rotation restriction projection which protrudes in a radial direction from an inner circumferential surface of the front plate, the rotation restriction projection contacting one side of the robot body to prevent the front plate from rotating after the rotation restriction projection contacts the one side of the robot body.

15. The bumper assembly of claim 1, wherein the first sensor is a contact sensor and disposed at a rear side of the sliding member, wherein the sliding member includes an accommodating groove which is recessed in the front direction from a rear surface of the sliding member, a pressing member which is inserted into the accommodating groove and coupled to the sliding member to be movable in the front and rear directions, and a third elastic member which is interposed between the accommodating groove and the pressing member so as to press the pressing member toward the first sensor, and wherein the pressing member moves into the pressing member after the pressing member comes into contact with the first sensor.

* * * * *